H. Recher,
Water Gate,
Nº 63,302. Patented Mar. 26, 1867.
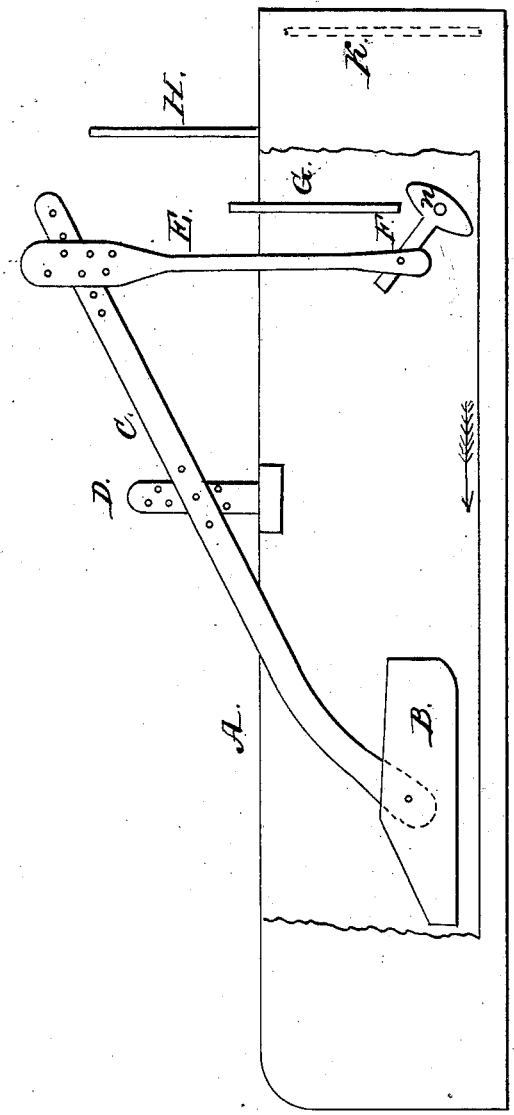
Witnesses:
Wm Mitchell
Thos D. Mitchell
Inventor:
Henry Recher

United States Patent Office.

HENRY RECHER, OF LIBERTY, OHIO.

Letters Patent No. 63,302, dated March 26, 1867.

---

IMPROVED WATER-GATE.

---

The Schedule referred to in these Letters Patent and making part of the same.

---

TO ALL WHOM IT MAY CONCERN:

Be it known that I, HENRY RECHER, of Liberty, in the county of Montgomery, and State of Ohio, have invented a new improvement in Automatic Water-Gates; and I do hereby declare that the following is a full and exact description thereof, reference being had to the accompanying drawings, and the letters of reference marked thereon.

My invention consists in a peculiar arrangement and combination of devices for operating the gate by means of a float. In the construction and use of water-gates operated by a float, it is very important to prevent the disturbing influence of the current of water, and also to avoid sliding friction, either or both of which may disturb the proper action of the float employed to regulate the gate and amount of water allowed to pass the gateway, and the chief object of my invention is to accomplish these desirable results.

The accompanying drawing represents a lateral view of my improved water-gate, the side of the trough being cut away, better to show the other parts. In the drawing, the trough A may be of any ordinary construction, with the common grate K, (shown in dotted lines,) and a partition or bulk-head, G, extending down to the gateway in the usual manner. Under this partition G, and directly in the gateway, I place a rotating gate or valve, F, and suspend or balance the same upon a central axle, pivot, or hinge, $n$, in such manner that the current of water running through the gateway will pass partly above and partly below the gate F, and thus press equally or nearly equally above the axle $n$ and below the same. By this arrangement the current above and below the gate tends to hold the latter in counterpoise so as to be easily affected by the float, the action of which will now be described.

The gate F has an arm pivoted to the connecting-rod E, which in turn is pivoted to the lever C. This lever C has its fulcrum upon the standard D, and its lower end is connected with the float B. The lever C, the standard D, and the connecting-rod E, are all provided with several holes for adjusting the pivots and regulating the action of the float B upon the gate F. It will be readily seen that the rising of the float B will rotate the gate F, so as to diminish the amount of water passing the gateway, and the falling of the float will open the gate and increase the flow of water.

Having thus fully described my invention, what I claim, and desire to secure by Letters Patent of the United States, is—

I claim the arrangement and combination of the centrally-hinged gate F, with the connecting-rod E, lever C, and float B, all constructed and operated substantially as described.

HENRY RECHER.

Witnesses:
WM. MITCHELL,
THOS. D. MITCHELL.